UNITED STATES PATENT OFFICE.

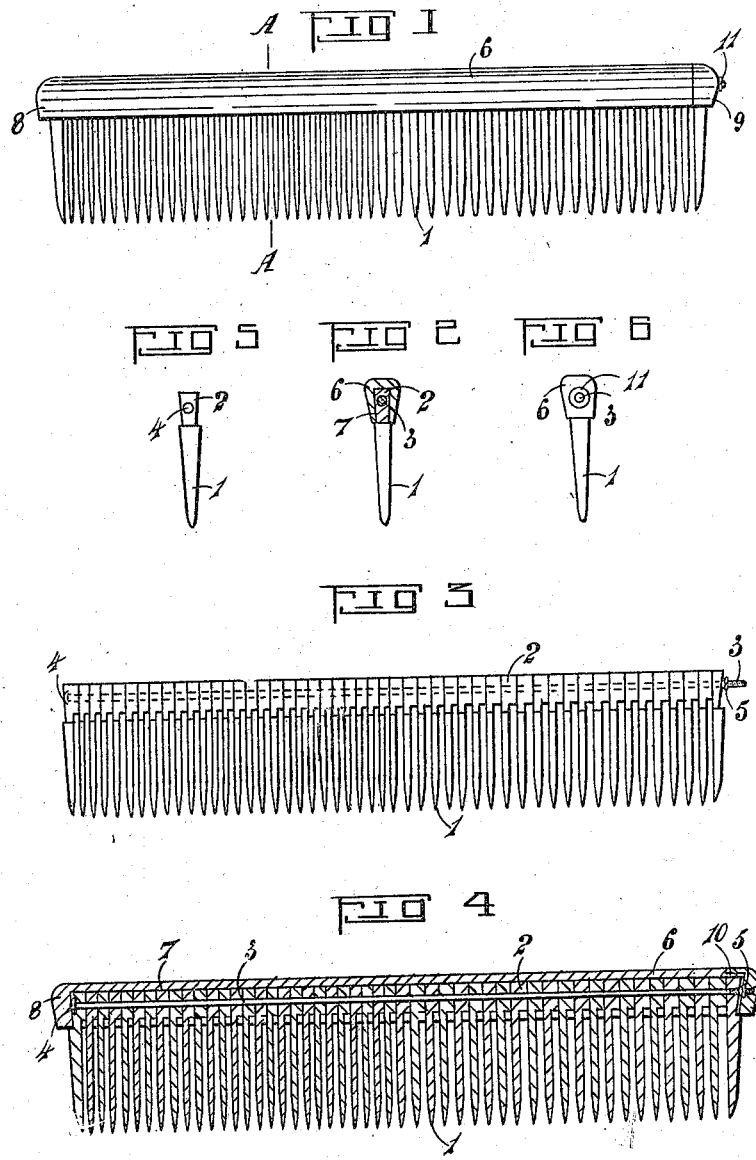

EDWIN GLANVIL LANGTON, OF MASTERTON, NEW ZEALAND.

TOILET COMB.

No. 893,332.  Specification of Letters Patent.  Patented July 14, 1908.

Application filed May 7, 1906. Serial No. 316,420.

*To all whom it may concern:*

Be it known that I, EDWIN GLANVIL LANGTON, a subject of His Majesty the King of Great Britain and Ireland, and residing at Queen street, Masterton, in the provincial district of Wellington, in the Colony of New Zealand, have invented certain new and useful Improvements in Toilet Combs, of which the following is a specification.

The object of this invention is to provide a comb having teeth which may be easily removed from the back of the comb for the purposes of cleaning and renewal. According hereto each tooth is made separately and has a dovetail shaped root and a bolt hole. The teeth are placed upon a bolt passing through the said hole, and clamped together by a nut threaded upon a screwed end of the bolt. The back has a dovetail groove into which the roots of the teeth fit. A cap closes the end of the back after the teeth have been placed in position. The cap is fitted tightly upon the back, or is secured by extending the bolt through the cap and providing a second nut, which may enter a recess formed in the cap.

The drawing illustrates the invention.

Figure 1 is an elevation of the comb, Fig. 2 a cross sectional elevation on line A—A Fig. 1, Fig. 3 an elevation of the teeth in position on their bolt, and Fig. 4 a longitudinal section. Figs. 5 and 6 are end elevations.

Referring to the drawing, the teeth 1 have dovetail roots 2 shown clearly in Fig. 2 and are provided with bolt holes through which a bolt 3 having a head 4 is passed. The teeth are clamped together by a nut 5 screwed upon the end of the bolt 3.

The back 6 has a dovetail groove 7 adapted to receive the roots 2 of the teeth, the end 8 of the back being solid and forming a stopped end to the said groove. The other end of the back is closed by a cap 9 which fits tightly upon the reduced end 10 of the back. As a further security the bolt 3 is prolonged through a hole provided in the cap 9, and is held by a nut 11 screwed upon the said bolt and passing into a recess 12 formed in the cap.

What I do claim and desire to secure by Letters Patent of the United States is:—

A toilet comb comprising in combination with a back having a groove, and a stopped end, teeth having dovetailed roots and bolt holes, a bolt passing through the bolt holes, a nut upon the bolt clamping the teeth together, a cap fitting the end of the back, and a second nut passing into a recess outside the cap and screwing tightly upon the bolt for securing the cap upon the back, substantially as set forth.

In testimony whereof I have signed my name to this specification in the presence of two witnesses.

EDWIN GLANVIL LANGTON.

Witnesses:
 JOHN WOOD JONES,
 FREDERICK MARTIN.